United States Patent [19]

Brulet

[11] Patent Number: 4,716,195
[45] Date of Patent: Dec. 29, 1987

[54] PROCESS FOR THE PREPARATION IN MICROSUSPENSION OF A VINYL CHLORIDE POLYMER LATEX AND RESULTANT PRODUCTS

[75] Inventor: Daniel Brulet, Saint-Auban, France

[73] Assignee: Societe d'Extrusion et de Transformation, France

[21] Appl. No.: 903,023

[22] Filed: Sep. 2, 1986

[30] Foreign Application Priority Data

Sep. 6, 1985 [FR] France ............................. 85 13267

[51] Int. Cl.$^4$ ............................................. C08L 27/06
[52] U.S. Cl. ................................................... 524/851
[58] Field of Search ........................................ 524/851

[56] References Cited

U.S. PATENT DOCUMENTS

| | | | |
|---|---|---|---|
| 2,771,457 | 11/1956 | Barnes et al. | 524/851 |
| 3,595,840 | 7/1971 | Moberly et al. | 524/851 |
| 4,093,788 | 6/1978 | Jin et al. | 526/74 |
| 4,181,787 | 1/1980 | McOnie et al. | 526/62 |
| 4,191,676 | 3/1980 | Hall | 524/566 |
| 4,256,863 | 3/1981 | McOnie et al. | 526/62 |

FOREIGN PATENT DOCUMENTS

| | | | |
|---|---|---|---|
| 0035618 | 5/1979 | Fed. Rep. of Germany | 524/851 |
| 1485547 | 5/1967 | France . | |
| 4314230 | 6/1968 | Japan | 524/851 |
| 4889990 | 11/1973 | Japan . | |
| 52883 | 1/1977 | Japan | 524/851 |

Primary Examiner—Joseph L. Schofer
Assistant Examiner—N. Sarofim
Attorney, Agent, or Firm—Sigalos & Levine

[57] ABSTRACT

A process for the preparation of a vinyl chloride polymer latex having particles with a mean diameter between about 0.2 and 0.8 μm and containing at least one organosoluble polymerization initiator comprising dispersing in an aqueous reaction medium also containing parabenzoquinone, at least one monomer, at least one anionic emulsifier and optionally at least one nonionic emulsifier, and from about 0.004 to 0.16% by weight, with respect to said at least one monomer, of said initiator expressed in terms of active oxygen, polymerizing said at least one monomer at a desired polymerization temperature, $\theta_1$, and continuously adding parabenzoquinone to said aqueous reaction medium during the polymerization when the temperature $\theta_2$ of the reaction medium is such that the difference $\theta_2 - \theta_1$ exceeds a value from 0° to +5° C. The invention also includes the resultant products and their use in seeded microsuspensions for the preparation of vinyl chloride polymers.

7 Claims, No Drawings

PROCESS FOR THE PREPARATION IN MICROSUSPENSION OF A VINYL CHLORIDE POLYMER LATEX AND RESULTANT PRODUCTS

BACKGROUND OF THE INVENTION

The present invention relates to a process for the preparation of a vinyl chloride polymer latex whose particles have a mean diameter between 0.2 and 0.8 μm and contain at least one organosoluble polymerization initiator, by polymerization in microsuspension of the corresponding monomer or monomers. The object of the present invention likewise is the latexes resulting therefrom, as well as their application as seeding products for the preparation in seeded microsuspension of homo and co-polymers of vinyl chloride. Since the particles of said latexes contain the entire amount of initiator required for the polymerization in seeded microsuspension, said polymerization does not necessitate any supplementary addition of polymerization initiator.

As used herein, the phrases "polymerization in microsuspension" or "fine suspension" mean a polymerization in the presence of an organosoluble initiator or initiators of at least one monomer dispersed by forcible mechanical means in an aqueous medium containing an emulsifier as stabilizer.

For the preparation of polymers of vinyl chloride by polymerization in seeded microsuspension, French Pat. No. 1,485,547 discloses the use as the seeding product of a latex whose particles contain the entire amount of initiator necessary for said polymerization.

The procedures used since then for the preparation by polymerization in microsuspension of such a latex have the following disadvantages:

(i) During the preparation of the dispersion of the monomer or monomers which is generally carried out at a temperature between 10° and 30° C., most frequently the formation of crusts is observed which disturb the operation of mechanical means used and by doing so lead to a latex whose mean particle diameter is not reproducible from one operation to another; and (ii) During the polymerization of the monomer or monomers thus dispersed, the large quantity of initiator present, which can be equal to more than 20 times the amount needed for the polymerization, frequently leads to sharp temperature increases of the reaction medium, which can exceed 10° C., and to considerable crust formation.

SUMMARY OF THE INVENTION

The process which is the object of the present invention does not exhibit the disadvantages stated above.

Briefly, the present invention comprises a process for the preparation of a vinyl chloride polymer latex having particles with a mean diameter between about 0.2 and 0.8 μm and containing at least one organosoluble polymerization initiator comprising dispersing at least one monomer in an aqueous reaction medium also containing parabenzoquinone, at least one anionic emulsifier and optionally at least one nonionic emulsifier, and from about 0.004 to 0.16% by weight, with respect to said at least one monomer, of said initiator expressed in terms of active oxygen, polymerizing said at least one monomer at a desired polymerization temperature, $\theta_1$, and continuously adding parabenzoquinone to said aqueous reaction medium during the polymerization when the temperature $\theta_2$ of the reaction medium is such that the difference $\theta_2 - \theta_1$ exceeds a value from 0° to +5° C.

The invention also comprises the resulting products and their use in a seeded microsuspension process as hereinafter described.

DETAILED DESCRIPTION

It has been found that the addition of parabenzoquinone to the aqueous medium prior to performing the dispersion of the monomer or monomers eliminates the formation of crusts and that its addition during the polymerization operation, under the conditions of the procedure of the invention, limits the temperature increases to less than 6° C. and at this stage substantially reduces the formation of crusts. It has likewise been observed that the use, under the same conditions, of hydroquinone or of methylhydroquinone in place of the parabenzoquinone, only vary slightly diminishes the disadvantages stated above.

The parabenzoquinone added to the aqueous medium prior to performing the dispersion of the monomer or monomers generally represents 0.0005 to 0.005% by weight with respect to the monomer or monomers.

The parabenzoquinone added to the reaction medium during the course of the polymerization operation generally represents 0.0005 to 0.025% by weight with respect to the monomer or monomers and is preferably used in the form of an aqueous dispersion. The parabenzoquinone content of said aqueous dispersion is generally from 0.01 to 1% by weight.

As used herein the phrase "polymers of vinyl chloride" means vinyl chloride homo and co-polymers, the latter containing at least 50% by weight of vinyl chloride and at least one monomer copolymerizable with vinyl chloride. The copolymerizable monomers are those generally employed in the conventional techniques of copolymerization of vinyl chloride. One can site the vinyl and vinylidene esters of mono and polycarboxylic acids, such as vinyl acetate, propionate, and benzoate; unsaturated mono and poly-carboxylic acids such as acrylic, methacrylic, maleic, fumaric, itaconic, as well as their aliphatic, cycloaliphatic, aromatic esters, their amides, their nitriles; allyl, vinyl and vinylidene halides; alkyl vinyl ethers; and olefins.

According to the process of the instant invention, one can utilize all of the organosoluble polymerization initiators likely to be used for the preparation in microsuspension of vinyl chloride polymers and represented by the generators of free radicals such as organic peroxides like lauroyl peroxide, acetylcyclohexanesulfonyl peroxide, isobutyroyl peroxide, dichloroacetyl peroxide, trichloroacetyl peroxide; peroxydicarbonates like ethyl peroxydicarbonate, ethyl hexyl peroxydicarbonate, isopropyl peroxydicarbonate, isobutyl peroxydicarbonate; tertiobutyl permethoxyacetate; tertiobutyl perethoxyacetate; and tertiobutyl perphenoxy-2-propionate. Each polymerization initiator free radical generator can be expressed in terms of active oxygen. In the case of a peroxide compound 1 molecule of said peroxide compound by decomposition liberates 1 oxygen ion, i.e. corresponds to 1 atom of active oxygen. In the case of a polymerization initiator free radical generator other than a peroxide compound, it is accepted to express it in active oxygen by likewise considering that 1 molecule of said polymerization initiator corresponds to 1 atom of active oxygen.

The selection of the organosoluble initiator depends on its rate of decomposition at the selected reaction temperature. Said initiator must in fact be sufficiently reactive so that by using 0.004 to 0.16% by weight with respect to the monomer or monomers, of said initiator expressed in active oxygen one obtains the preparation of the latex in time durations of between 4 and 20 hours. However, the rate of decomposition of the initiator must not be too fast, so that the quantity of initiator decomposed during the preparation of the latex does not exceed one half of the quantity of initiator used. In order to do this, it is thus necessary to select an initiator whose half-life duration is such that the proportion of initiator consumed during the preparation of the latex is between 1 and 50% by weight of the entire amount of initiator used.

In the case in which several organosoluble initiators are used, it is advantageous to select them to be of different reactivity: the most reactive initiators principally act during the course of the preparation of the latex according to the invention, whereas the least reactive initiators will react principally during the course of the polymerization in seeded microsuspension performed for the preparation of vinyl chloride polymers in the presence of said latex used as seeding product.

The amount of water used according to the procedure of the invention is such that the initial content of monomer or monomers of the reaction medium is generally between 30 and 50% by weight.

The anionic emulsifiers preferably are represented by soaps by fatty acids, alkyl sulfates, alkyl sulfonates, alkyl aryl sulfonates, vinyl sulfonates, allyl sulfonates, alkylsulfosuccinate, alkaline alkyl phosphates, and the non-ionic emulsifiers are represented by the polycondensates of ethylene or propylene oxide with various organic hydroxylated compounds. It can be advantageous to likewise add said emulsifier or emulsifiers to the reaction medium during the course of polymerization. The amount of emulsifier is generally between 0.3 and 4% by weight with respect to the monomer or monomers.

The dispersion of the monomer or monomers in the aqueous medium is carried out at a temperature generally between 10° and 30° C. by means of a forcible mechanical means such as, for instance, a colloid mill, rapid pump, vibration agitator, or ultrasound apparatus.

The polymerization operation is carried out under autogenous pressure and moderate agitation, by raising the dispersion obtained to the aimed at polymerization temperature $\theta_1$, generally between 30° and 65° C., then by adding the parabenzoquinone, in continuous manner, to the reaction medium when the temperature $\theta_2$ of the reaction medium is such that the difference $\theta_2 - \theta_1$ exceeds a value selected in the interval going from 0° to +5° C. and preferably from 0° to +2° C. After the pressure drops the reaction is stopped and the unconverted monomer or monomers are degasified.

The invention will be further described in connection with the following examples which are set forth for purposes of illustration only. Examples 1, 3, 4, 5 and 6 are given by way of comparison and Example 2 is according to the present invention.

EXAMPLE 1

There were mixed:
(1) 40 kg of vinyl chloride,
(2) 0.6 kg of lauroyl peroxide,
(3) 4 kg of a 10% by weight aqueous solution of sodium dodecylbenzene sulfonate, and
(4) water in such a quantity that the vinyl chloride content of the mixture is 43% by weight.

A fine dispersion of the vinyl chloride in the aqueous medium was achieved, then said dispersions was introduced into an autoclave of 120-liter capacity, equipped with a double jacket and with an anchor agitator. The thus formed reaction medium was raised to the aimed at polymerization temperature $\theta_1$, of 52° C. under autogenous pressure, the speed of the agitator being 50 RPM.

After the pressure drop, i.e. after 9 hours, the vinyl chloride which had not reacted was degasified. A latex was obtained whose weight content of dry material was 40% by weight and whose particles had a mean diameter of 0.4 μm and contained 1.4% by weight, with respect to the polymer, of lauroyl peroxide.

EXAMPLE 2

The procedure of Example 1 was followed, but prior to carrying out the fine dispersion of the vinyl chloride in the aqueous medium, parabenzoquinone (PBQ) was added to said medium and during the course of polymerization, parabenzoquinone was likewise added in continuous manner to the reaction medium when the temperature $\theta_2$ of the reaction medium exceeded 53° C. The parabenzoquinone added to the reaction medium during the course of polymerization was used in the form of a dispersion in 2 liters of water.

EXAMPLES 3 and 4

The procedure of Example 2 was followed, but the parabenzoquinone thereof was replaced by hydroquinone (HQ).

EXAMPLES 5 and 6

The procedure of Example 2 was followed, but the parabenzoquinone thereof was replaced by methylhydroquinone (MEHQ).

Table I which follows indicates for each example:
1. the nature of the additive (PBQ, HQ or MEHQ), if used;
2. the amount of additive added prior to carrying out the dispersion;
3. the amount of additive added during the course of polymerization;
4. the amount of crusts formed during the achievement of the dispersion;
5. the amount of crusts formed during polymerization, and
6. the maximum temperature difference $\theta_2 - \theta_1$ reached during the course of polymerization.

TABLE I

| | Examples | | | | | |
|---|---|---|---|---|---|---|
| | 1 | 2 | 3 | 4 | 5 | 6 |
| Nature of additive | — | PBQ | HQ | HQ | MEHQ | MEHQ |
| Amount of additive added: | | | | | | |
| (a) prior to achieving the dispersion (g) | — | 1.2 | 1.2 | 1.2 | 1.2 | 1.2 |
| (b) during the course of the polymerization (g) | — | 1.2 | 1.2 | 8.4 | 1.2 | 7.2 |

TABLE I-continued

|  | Examples | | | | | |
| --- | --- | --- | --- | --- | --- | --- |
|  | 1 | 2 | 3 | 4 | 5 | 6 |
| Amount of crusts formed: | | | | | | |
| (a) during the carring out of the dispersion (g) | 220 | 2 | 215 | 210 | 220 | 215 |
| (b) during the polymerization (kg) | 2.1 | 0.3 | 2.1 | 2.0 | 2.0 | 1.9 |
| Maximum difference $\theta_2-\theta_1$ (°C.) | +8 | +2 | +8 | +8 | +8 | +7 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined in the appended claims.

What is claimed is:

1. A process for the preparation of a vinyl chloride polymer latex having particles with a mean diameter between about 0.2 and 0.8 μm and containing at least one organosoluble polymerization initiator comprising:
   a. dispersing in an aqueous reaction medium also containing parabenzoquinone, vinyl chloride or vinyl chloride and at least one monomer copolymerizable therewith, at least one anionic emulsifier, and from about 0.004 to 0.16% by weight, with respect to said monomers, of said initiator expressed in terms of active oxygen,
   b. polymerizing at one at a desired polymerization temperature, $\theta_1$, and
   c. continuously adding parabenzoquinone to said aqueous reaction medium during the polymerization when the temperature $\theta_2$ of the reaction medium is such that the difference $\theta_2-\theta_1$ exceeds a value from 0° to +5° C.

2. The process of claim 1 wherein the parabenzoquinone is added during the course of the polymerization when the difference $\theta_2-\theta_1$ exceeds a value from 0° to +2° C.

3. The process of claim 2 wherein the amount of parabenzoquinone added to said aqueous reaction medium prior to carrying out the dispersion of said at least one monomer is from about 0.0005 to 0.005% by weight based on the weight of said at least one monomer.

4. The process of claim 3 wherein the amount of parabenzoquinone added to said aqueous reaction medium during the polymerization is from about 0.0005 to 0.025% by weight based on the weight of said at least one monomer.

5. The process of claim 4 wherein the parabenzoquinone is added to said aqueous reaction medium in the form of an aqueous dispersion.

6. The process of claim 5 wherein said aqueous reaction medium prior to polymerization contains from about 30 to 50% by weight of said at least one monomer.

7. The process of claim 4 wherein the parabenzoquinone content of said aqueous dispersion is from 0.01 to 1% by weight.

* * * * *

UNITED STATES PATENT AND TRADEMARK OFFICE
CERTIFICATE OF CORRECTION

PATENT NO. : 4,716,195
DATED : December 29, 1987
INVENTOR(S) : Daniel BRULET

It is certified that error appears in the above-identified patent and that said Letters Patent are hereby corrected as shown below:

Column 3, line 29, "by" should read --of--; and

Column 5, line 34, (in Claim 1.b.) cancel the phrase "at one".

Signed and Sealed this

Twenty-third Day of August, 1988

Attest:

DONALD J. QUIGG

Attesting Officer

Commissioner of Patents and Trademarks